United States Patent [19]

Basi et al.

[11] 4,435,247
[45] Mar. 6, 1984

[54] METHOD FOR POLISHING TITANIUM CARBIDE

[75] Inventors: Jagtar S. Basi, Fishkill; Eric Mendel, Poughkeepsie, both of N.Y.

[73] Assignee: International Business Machines Corporation, Armonk, N.Y.

[21] Appl. No.: 473,938

[22] Filed: Mar. 10, 1983

[51] Int. Cl.³ .................. B44C 1/22; C03C 15/00; C03C 25/06

[52] U.S. Cl. .................. 156/636; 156/345; 156/639; 156/903; 252/79.1

[58] Field of Search ............... 156/345, 636, 639, 667, 156/903, 645; 252/79.1; 51/317, 281 R

[56] References Cited

U.S. PATENT DOCUMENTS

| | | | |
|---|---|---|---|
| 3,615,955 | 10/1971 | Regh et al. | 156/636 |
| 3,869,323 | 3/1975 | Basi | 156/17 |
| 3,869,324 | 3/1975 | Basi et al. | 156/17 |
| 4,011,099 | 3/1977 | Gutsche | 134/7 |
| 4,057,939 | 11/1977 | Basi | 51/281 |
| 4,130,847 | 12/1978 | Head | 360/122 |
| 4,251,841 | 2/1981 | Jacobs | 360/122 |

OTHER PUBLICATIONS

Technical Bulletin 1-237, Syton Colloidal Silica and its Applications, pp. 1-16, Monsanto Co.
Syloid 701 Silicon Wafer Polishing, Davison Chemical Division.
Quso, Micro Fine Precipitated Silicas, Philadelphia Quartz Co., pp. 1-8.
Bulletin K-5, Nalcoag Colloidal Silicas.
Specialty Chemicals, P Q Corporation.
Nalco, Nalcoag 1034 A, Nalco Product Bulletin K5-10-34A.
Ludox Colloidal Silica, DuPoint, pp. 1-20.
Report on the Measurement of Surface Finish by Stylus Methods, Mar. 24, 1944, Reason et al., pp. 9-20.
Nalco, Technifax, Specialty Chemicals TF109, Physical and Chemical Properties of Nalcoag Silica Sols, 3-79.
Nalco, Technifax, Specialty Chemicals TF110, Applications of Nalcoag Colloidal Silicas, 12-80.
Rodel, Wafer Polishing and Fixturing Products.
Rodal, Polishing Products.
Politex Polishing Poromerics, Geos.
Polishing Pads, Newman.
A. I. Avgustinik et al., in "Reaction of Titanium Carbide with Water" published in Porosh Met, 1967 (Russian).
"The Preparation of Sapphire Surfaces for Silicon Epitaxy" by T. A. Zeveke et al., published in Soviet Physics-Crystallography, vol. 13, No. 3, Nov.-Dec. 1968, pp. 493 through 495.
"Removal of the Microscopic Polishing Damage from Sapphire and Spinel" by M. Berkenblit et al., IBM Technical Disclosure Bulletin, vol. 13, No. 12, May 1971, pp. 3781 and 3782.
"The Chemical Polishing and Etch Pitting of Sapphire" by R. G. Vardiman, published in J. Elec. Chem. Soc., vol. 118, No. 11, pp. 1804-1809, Nov. 1971.
"Polishing of Sapphire and Colloidal Silica" by H. W. Gutsche et al., J. Elec. Soc. Solid State Science and Technology, vol. 125, No. 1, pp. 136-138, Jan. 1978.
"Pad Materials for Chemical-Mechanical Polishing" by Eric Mendel et al., in vol. 79-1, Extended Abstracts of Elec. Chem. Soc. Spring Meeting, Boston, Mass., May 6-11, 1979, Abs. No. 186, pp. 488-490.

*Primary Examiner*—William A. Powell
*Attorney, Agent, or Firm*—G. O. Saile

[57] ABSTRACT

A method for the chemical-mechanical polishing of titanium carbide surfaces to a high degree of perfection is described. The titanium carbide surfaces are continuously wetted with a water slurry containing a soft abrasive material. The continuously wiping of the titanium carbide surface is accomplished with a firm surface using pressure while maintaining a relative movement between the titanium carbide surface and the firm surface to remove the water reacted titanium carbide product from the high points of the titanium carbide surface. This method is continued until a high degree of perfection of the surface is accomplished. The slurry is typically composed of colloidal silicon dioxide dispersed in water. The titanium carbide surface can also include an aluminum oxide component. Where aluminum oxide is present it is preferred to have about 60 to 80% aluminum oxide and 40 to 20% titanium carbide by weight in the surface structure.

9 Claims, 2 Drawing Figures

METHOD FOR POLISHING TITANIUM CARBIDE

DESCRIPTION

Field of the Invention

This invention relates to polishing of titanium carbide mechanical parts using a simultaneous chemical and mechanical polishing technique to provide surfaces having a high degree of perfection.

Cross-Reference to Related Patent Application

Pending patent application Ser. No. 474,120, filed like date entitled "Method for Polishing Amorphous Aluminum Oxide" by J. S. Basi et al.

Description of the Prior Art

Various mechanical parts, particularly those which are moving in relation to other parts, require a polished surface having a high degree of perfection. It has been proposed to form mechanical parts of high temperature pressed parts composed of titanium carbide powders alone or in combination with particles of aluminum oxide or similar material. The resulting parts have desired properties of resistance to breakage, improved machining and good wearability. It is also desirable to have such mechanical parts highly polished to a substantial degree of perfection.

Titanium carbide is chemically non-reactive and a relatively hard material. Titanium carbide by itself or as a composite with aluminum oxide has not been polished using chemical or chemical-mechanical techniques. Substrates of these materials have been machined using conventional diamond machining and mechanical lapping methods.

There has been substantial work done in the polishing of hard materials in the semiconductor parts. Particularly, silicon and sapphire wafers have been polished to a high degree of perfection by various workers in the field. Examples of this work are H. W. Gutsche, U.S. Pat. No. 4,011,099, Mar. 8, 1977; J. S. Basi, U.S. Pat. No. 4,057,939, Nov. 15, 1977; "The Preparation of Sapphire Surfaces for Silicon Epitaxy" by T. A. Zeveke et al. published in Soviet Physics-Crystallography, Vol. 13, No. 3, November-December 1968, p. 493 through p. 495; "Removal of the Microscopic Polishing Damage From Sapphire and Spinel" by M. Berkenblit et al., IBM Technical Disclosure Bulletin, Vol. 13, No. 12, May 1971, pp. 3781 and 3782; "The Chemical Polishing and Etch Pitting of Sapphire" by R. G. Vardiman, published in J. Elec. Chem. Soc., Vol. 118, No. 11, pp. 1804 through 1809, November 1971; and "Polishing of Sapphire and Colloidal Silica" by H. W. Gutsche et al., J. Elec. Soc. Solid State Science and Technology, Vol. 125, No. 1, pp. 136 through 138, January 1978. The chemical and mechanical polishing of other materials have also been accomplished, for example, zinc selenide in J. S. Basi, U.S. Pat. No. 3,869,323, Mar. 4, 1975 and cadmium telluride by J. S. Basi, U.S. Pat. No. 3,869,324, Mar. 4, 1975.

A. I. Augustinik et al. in "Reaction of Titanium Carbide with Water" published in Porosh Met, 1967, (Russian) CF. CA66:93299a shows that under certain condition titanium carbide powder can form a hydrolyzed layer on the surface of the titanium carbide powder. The hydrolysis takes place on the particle surface. The hydrolyzation of the titanium carbide powder was produced by mixing the titanium carbide powder was distilled water for 20 hours in a vibratory mill.

SUMMARY OF THE INVENTION

A method for the chemical-mechanical polishing of titanium carbide surfaces to a high degree of perfection is described. The titanium carbide surfaces are continuously wetted with a water slurry containing a soft abrasive material. The continuously wiping of the titanium carbide surface is accomplished with a firm surface using pressure while maintaining a relative movement between the titanium carbide surface and the firm surface to remove the water reacted titanium carbide product from the high points of the titanium carbide surface. This method is continued until a high degree of perfection of the surface is accomplished. The slurry is typically composed of colloidal silicon dioxide dispersed in water. The titanium carbide surface can also include an aluminum oxide component. Where aluminum oxide is present it is preferred to have about 60 to 80% aluminum oxide and 40 to 20% titanium carbide by weight in the surface structure.

It is an object of the invention to produce a titanium carbide surface polished with a high degree of perfection.

It is another object of the invention to provide a method for chemical-mechanical polishing of a titanium carbide surface using a water slurry containing a soft abrasive material while continuously wiping the titanium carbide surface with a firm surface.

It is a still further object of the invention to provide a method for chemical-mechanical polishing of an aluminum oxide-titanium carbide surface to a high degree of perfection using a water slurry containing a soft abrasive material and continuously wiping the titanium carbide surface with a firm surface.

DESCRIPTION OF THE PREFERRED EMBODIMENTS

It is preferred to utilize a combination of aluminum oxide and titanium carbide in a fine grain mixture that has been pressed and sintered or hot pressed. However, titanium carbide particles alone may be compressed into desired parts in a similar fashion. The mixture is characterized by an average particle size of less than about 5 microns and preferably the particles are 1 to 2 microns in length. The preferred mixture is in the range of about 60 to 80% aluminum oxide and 40 to 20% titanium carbide by weight. The high density mixture has low porosity and exhibits improvements in Young's and Shear moduli of elasticity and modulus of rupture.

To produce a material having the desired properties the materials are ground into powders of the desired particle sizes and mixed in the desired composition of about 80 to 60% aluminum oxide to 20 to 40% titanium carbide to a homogenous mixture. The dry powder is measured and poured to fill a graphite pressing mold. The powder charge is then precompacted with an applied load of approximately 1000 to 3000 pounds per square inch. The precompacted mold is loaded into a hot press and heated to a temperature in the range of 1400° C. to 1650° C. The pressed part is hot pressed, when the desired temperature is reached at a pressure of between 4000 and 6000 psi. The pressed part is cooled to room temperature for a desired time to maintain a stress-free condition. The cooled part is removed from the mold, deburred and sand blasted to remove any excess graphite. The part is now machined to the desired shape and dimensions using conventional diamond machining and mechanical lapping methods.

Figure 1:
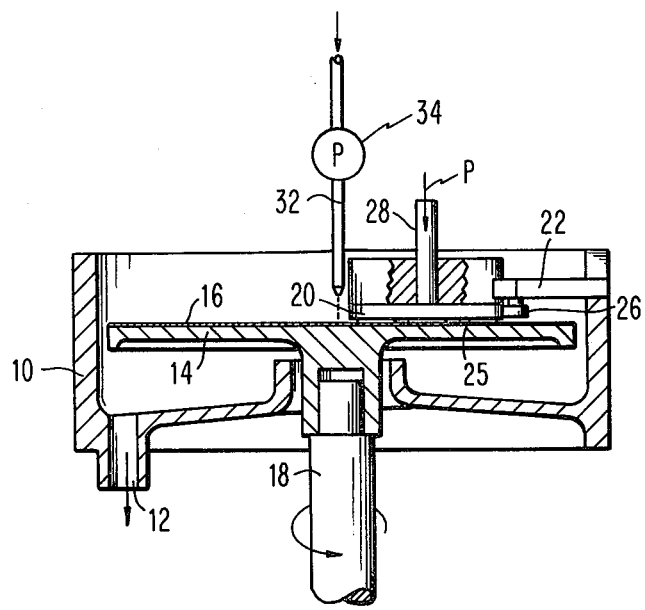
FIG. 1 shows a side view of an apparatus, partially in section which is useful in practicing the polishing process of the invention.
Figure 2:
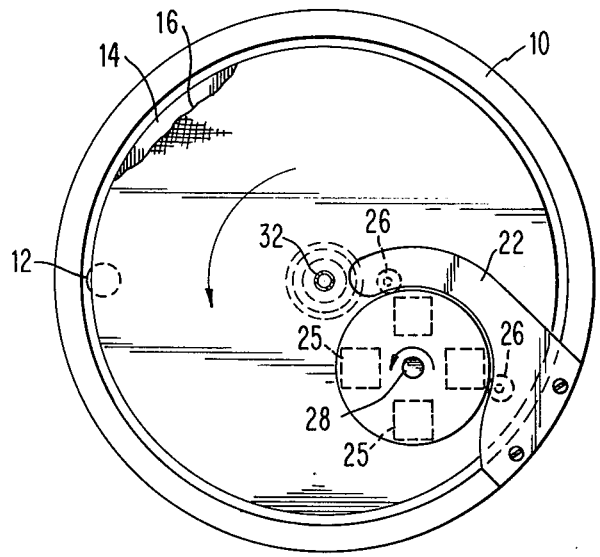
FIG. 2 shows a plan view of the FIG. 1 apparatus.

The polishing process for either titanium carbide, a combination of titanium carbide and aluminum oxide or the like may be understood with reference to FIGS. 1 and 2. The polishing machine includes a bowl 10 having a slurry outlet 12 and a driven plate 14. Mounted on the plate 14 by any suitable means (not shown) is a soft, firm surface or pad 16 composed of a poromeric material. The pad materials used are true poromeric comprised of a top coat and substrate layer. The thickness of top coat is critical. Top coat thickness is 15-20 mils, substrate is 20-25. Total package is 40±2 mils thick. The top coat is designed and made by a coagulation process to obtain a macro and micro pore random structure. The macro pores are irregularly shaped and randomly dispersed without any preferred orientation in the top coat layer. The micro pore comprise the rest of top layer. For further information concerning this material reference can be made to "Pad Materials for Chemical-Mechanical Polishing" by Eric Mendel et al., in Vol. 79-1, Extended Abstracts of Elec. Chem. Soc. Spring Meeting, Boston, Mass. May 6-11, 1979, Abs. No. 186, pp. 488-490. Pads of this type which are commercially available include: Rodel 210 made by Rodel Inc. of Newark, Del. USA, POLTEX made by the GEOS Corp., Stanford, CT. and NEWMAN polishing pads made by the G. Newman & CO., Santa Clara, Calif. The plate 14 is rotated by means of suitable driving means (not shown) coupled through shaft 18. Mechanical parts 25 to be polished, are mounted on the plate 20 by means of suitable adhesive or other suitable method. This plate 20 with its mounted parts thereon is maintained against the surface 16 by arm 22 having bearing surfaces 26 and a substantial pressure P applied through shaft 28 to urge the wafers strongly against the surface 16. The preferred pressure is between about 150 to 425 gm/cm$^2$. The arm 22 is suspended from the polishing bowl edge and positioned on the side of the plate 20 in the path of its normal rotation which is caused by the rotation of plate 14. The rotation of plate 14 produces a rotation of the plate 20. The surface of the parts 25 is continuously wetted with excess quantity of polishing slurry by flowing it through the pipe 30 with its restricted opening 32 onto the surface 16 of rotating plate 14. A parastolic pump 34 moves the slurry through the pipe 30. Excess slurry is splashed from the end of the rotating plate 14 and flows out of the excess slurry opening 12.

The aqueous dispersion of silicon dioxide can be conveniently employed in the form of silica sols and silica gels having silicon dioxide particle sizes in the range of 1 to 500 millimicrons, in concentrations of 6 to 16 weight percent. Convenient sources of the aqueous dispersion of the silicon dioxide, is the trademarked silica sol composition LUDOX colloidal silica made by E. I. Dupont Co., Wilmington, Del., NALCOAG 1034A colloidal silica made by Nalco Chem. Co., Chicago, Ill., QUSO silicas made by Philadelphia Quartz Co. of Philadelphia, Pa., SYLOID 701 wafer polishing material made by Davison Chem., Div. of W. R. Grace and Co., Baltimore, Md. and "Syton HT-50" made by Monsanto Company, St. Louis, Mo., USA.

The aqueous dispersion of silicon dioxide or silicon dioxide slurry is required to have a pH in the range of about 6 to 8.5. It is preferable that the slurry have a pH slightly acidic and of the order of pH 6. The acidic pH may be obtained by adding small quantities of hydrochloric acid to the dilute silicon dioxide slurry, for example, a solution of one part hydrochloric acid to 20 parts water would be added to the slurry to produce the desired pH. At pH higher than 8.5, the grain boundaries will appear indicating structural relief due to the attack of the solution at the grain boundaries and/or different removal rates for the components of the composite material, i.e., above pH 8.5 the titanium carbide grains polish at a noticably different rate than the aluminum oxide component. Lower pH polishing produces undesirably slow polishing rates. The polishing time is also dependent upon the pre-polishing surface roughness condition. It is preferred to reduce the roughness of the mechanical parts surface to about 5 micro inches (peak to valley height). This surface roughness can be obtained by using conventional lapping methods.

A chemical mechanical polishing process for polishing titanium carbide, even in the presence of aluminum oxide, operates very effectively to produce surface finishes of less than the order of 0.2 micro inches (peak to valley height). This measurement is actually the lower limit of the equipment so the surface finish is even better than that 0.2 micro inches. The surface finish is measured by the conventional stylus method. The chemical reaction is not fully understood but it appears that the slightly acidic water slurry has a reaction between the titanium carbide and the water in the slurry to form a hydrolyzed layer on the specimen surface which is in turn removed by the silicon dioxide slurry and polishing pad. The apparent chemical reaction is:

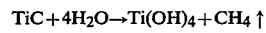
$$TiC + 4H_2O \rightarrow Ti(OH)_4 + CH_4 \uparrow$$

Where aluminum oxide is present the surface reaction is also not fully understood but believed to be as follows:

$$Al_2O_3 + 2SiO_2 + 2H_2O \rightarrow Al_2Si_2O_7 \cdot 2H_2O$$

The resulting polish produced under these conditions generates a highly perfect surface with no relief between the titanium carbide and aluminum oxide grain boundaries.

The following examples are included merely to aid in the understanding of the invention, and variations may be made by one skilled in the art without departing from the spirit and scope of the invention.

EXAMPLES 1 THROUGH 5

Titanium carbide-aluminum oxide particles in the size of between about 1 to 2 microns in length were formed into mechanical parts by the high temperature pressure molding technique described above in the specification. These parts were placed in the polishing apparatus illustrated by FIGS. 1 and 2. A mixture of 1 part silica sol with 4 parts of water was prepared. The silica sol has a silica content of about 50 weight percent with maximum particle size of 40 to 45 millimicrons. A dilute solution comprising 1 part hydrochloric acid and 20 parts water was added to the silica sol slurry while monitoring the pH of the solution. Table I gives the variation in the pH and the volume percent of the silica sol in the slurry. The Table I gives the result of each of the Examples in the form of removal rate in microns per hour and the surface finish (peak to valley) as measured by the conventional stylus method described in "Report on the Measurement of Surface Finish by Stylus Methods" by R. E. Reason, et al., published by the Rank Organization, Rank Taylor Hobson Division Leicester, England 1944. The Example 1 at the higher pH of 10 has a removal rate of 0.1 microns per hour. Grain boundaries appear at this higher pH indicating a structural relief due to attack at the grain boundaries. This is an unsatisfactory condition.

TABLE I

| Example | pH | Removal Rate Micron/hour | Weight % Silica | Surface finish in micro inches |
|---------|-----|--------------------------|-----------------|--------------------------------|
| 1 | 10 | .1 | 10 | Structural relief |
| 2 | 8 | .25 | 10 | <0.2 |
| 3 | 8.2 | .23 | 10 | <0.2 |
| 4 | 6 | .25 | 10 | <0.2 |
| 5 | 8 | .25 | 16 | <0.2 |

At higher concentrations, e.g. greater than 16 weight percent concentration of silica sol in the polishing slurry, solution gelling or thickening was noticed. This is unsatisfactory because it is difficult to flow the silica gel properly onto the surface of the polishing apparatus. At lower silica sol concentrations than about 6 weight percent, the polishing rate drops to unsatisfactory levels.

The resulting surfaces in Examples 2 through 5 were flat to less than 1 micron over the part surface and void of polishing induced defects. The polished area when measured with an interferometer set at one micron per fringe sensitivity, typically shows but one fringe indicating a flatness of one micron for these surfaces tested. These samples give similar results to the state of the art of surface flatness in the silicon technology.

The detailed examination used to bright light microscopy examination wherein the surface to be examined was held at an angle to the light beam from a light source in a darkened hood. Surface defects scatter light and appear as a bright spot, or line in case of scratches.

While the invention was particularly shown and described with reference to preferred embodiments thereof, it will be understood by those skilled in the art that the foregoing and other changes in form and details may be made therein without departing from the spirit and scope of the invention.

What is claimed is:

1. A method for the chemical-mechanical polishing of a titanium carbide surface to a high degree of perfection comprising:

maintaining said titanium carbide surface continuously wetted with a water slurry containing a soft abrasive material;

continuously wiping the titanium carbide surface with a firm surface using pressure while maintaining a relative movement between the titanium carbide surface and the firm surface to remove the water reacted titanium carbide product from the high points of the titanium carbide surface.

2. The method of claim 1 wherein said slurry is composed of colloidal silicon dixoide dispersed in water.

3. The method of claim 1 wherein the pH of the slurry is between about 6 to 8.5.

4. The method of claim 2 wherein the said titanium carbide surface includes aluminum oxide as a constituent.

5. The method of claim 4 wherein the composition is between about 60 to 80% aluminum oxide and 40 to 20% titanium carbide by weight.

6. The method of claim 5 wherein said composition consists of particles of aluminum oxide and titanium carbide having an average size of less than about 5 microns.

7. The method of claim 1 wherein said pressure is between about 150 to 525 $gm/cm^2$.

8. The method of claim 2 wherein $SiO_2$ portion of the slurry is less than 16 weight percent and less than 500 millimicron particle size.

9. The method of claim 1 wherein the resulting surface flatness is less than 0.2 micro inches after said polishing.

* * * * *